(12) United States Patent
Shi

(10) Patent No.: US 11,644,553 B2
(45) Date of Patent: May 9, 2023

(54) DETECTION OF REFLECTED LIGHT PULSES IN THE PRESENCE OF AMBIENT LIGHT

(71) Applicant: Samsung Electronics Co., Ltd., Suwon-si (KR)

(72) Inventor: Lilong Shi, Pasadena, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 398 days.

(21) Appl. No.: 16/900,810

(22) Filed: Jun. 12, 2020

(65) Prior Publication Data
US 2021/0325519 A1    Oct. 21, 2021

Related U.S. Application Data

(60) Provisional application No. 63/011,873, filed on Apr. 17, 2020.

(51) Int. Cl.
*G01S 7/487* (2006.01)
*G01S 7/48* (2006.01)
*G01S 17/10* (2020.01)
*G01S 7/4861* (2020.01)

(52) U.S. Cl.
CPC .......... *G01S 7/4873* (2013.01); *G01S 7/4808* (2013.01); *G01S 17/10* (2013.01); *G01S 7/4861* (2013.01)

(58) Field of Classification Search
CPC ....... G01S 7/487; G01S 7/4873; G01S 7/4876
See application file for complete search history.

(56) References Cited

U.S. PATENT DOCUMENTS

| | | |
|---|---|---|
| 2014/0368613 A1 | 12/2014 | Krupta |
| 2016/0077200 A1 | 3/2016 | Hassan et al. |
| 2017/0052065 A1 | 2/2017 | Sharma et al. |
| 2018/0253404 A1 | 9/2018 | Moore et al. |
| 2018/0292534 A1 | 10/2018 | Field |
| 2018/0321363 A1 | 11/2018 | Beer et al. |
| 2018/0372851 A1 | 12/2018 | Kienzler et al. |
| 2019/0018119 A1 | 1/2019 | Laifenfeld et al. |
| 2019/0041502 A1 | 2/2019 | Onal et al. |

(Continued)

OTHER PUBLICATIONS

Coates, P.B., "The correction for photon 'pile-up' in the measurement of radiative lifetimes", Journal of Scientific Instruments (Journal of Physics E), 1968, Series 2, vol. 1, pp. 878-879.

(Continued)

*Primary Examiner* — Eric L Bolda
(74) *Attorney, Agent, or Firm* — Lewis Roca Rothgerber Christie LLP

(57) ABSTRACT

A system and method for detecting a peak bin from among a plurality of bins in a window. In some embodiments, each of the bins has a lower limit and an upper limit and contains zero or more values. The method may include: identifying a first bin, from among a plurality of bins in a first subwindow of the window, the first bin containing n values, n being a positive integer, n being greater than or equal to the number of values in each of the other bins in the first subwindow; calculating a first height-to-area ratio, the first height-to-area ratio being equal to n divided by the number of values in the first subwindow; and comparing the first height-to-area ratio to a first threshold.

20 Claims, 9 Drawing Sheets

(56) References Cited

U.S. PATENT DOCUMENTS

| | | |
|---|---|---|
| 2019/0056497 A1 | 2/2019 | Pacala et al. |
| 2019/0250257 A1 | 8/2019 | Finkelstein et al. |
| 2019/0277952 A1 | 9/2019 | Beuschel et al. |
| 2020/0233066 A1* | 7/2020 | Kulesh .................. G01S 7/487 |
| 2021/0302548 A1* | 9/2021 | Chen ..................... G01S 7/487 |
| 2022/0043128 A1* | 2/2022 | Pacala .................. G01S 17/10 |

OTHER PUBLICATIONS

Gupta, A. et al., "Photon-Flooded Single-Photon 3D Cameras", Apr. 29, 2019, 23 pages, arXiv:1903.08347v2.

Huikari, J. et al., "A Laser Radar based on a "Impulse-like" Laser Diode Transmitter and a 2D SPAD/TDC receiver", 2017, 6 pages, IEEE.

Nissinen, I. et al., "A TDC-based 4x128 CMOS SPAD Array for Time-Gated Raman Spectroscopy", 2014, pp. 139-142, IEEE.

Pediredla, A. K. et al., "Signal Processing Based Pile-up Compensation for Gated Single-Photon Avalanche Diodes", Jun. 14, 2018, 17 pages, arXiv:1806.07437v1, Optical Society of America.

Unpublished U.S. Appl. No. 16/379,782, filed Apr. 9, 2019.

Charikar, Moses, et al. Finding frequent items in data streams. Theor. Comput. Sci. 312(1): 3-15 (2004) (Year: 2004).

Wang, Ke, "Towards Efficient 3D Reconstructions from High-Resolution Satellite Imagery," ProQuest Dissertations Publishing, 2018, The University of North Carolina, Chapel Hill, (URL: https://search.proquest.com/docview/2051459701), 134 pages.

U.S. Office Action dated May 4, 2022, issued in U.S. Appl. No. 16/379,782 (11 pages).

U.S. Final Office Action dated Aug. 8, 2022, issued in U.S. Appl. No. 16/379,782 (8 pages).

\* cited by examiner

DETECTION OF REFLECTED LIGHT PULSES IN THE PRESENCE OF AMBIENT LIGHT

CROSS-REFERENCE TO RELATED APPLICATION(S)

The present application claims priority to and the benefit of U.S. Provisional Application No. 63/011,873, filed Apr. 17, 2020, entitled "PILE-UP PROOF DEPTH MEASURE FOR SPAD 3D CAMERAS UNDER ALL AMBIENT CONDITIONS" the entire content of which is incorporated herein by reference. This application is related to U.S. patent application Ser. No. 16/379,782, filed Apr. 9, 2019, the entire content of which is incorporated herein by reference.

FIELD

One or more aspects of embodiments according to the present disclosure relate to lidar, and more particularly to detection of reflected pulses in the presence of ambient light.

BACKGROUND

In lidar systems, pulses of light are reflected from a target, and the round-trip delay may be used to estimate the range of the target. However, detecting the reflected light may be challenging when ambient light levels are high.

Thus, there is a need for an improved system and method for the detection of reflected light pulses in the presence of ambient light.

SUMMARY

According to an embodiment of the present disclosure, there is provided a method for detecting a peak bin from among a plurality of bins in a window, each of the bins having a lower limit and an upper limit and containing zero or more values, the method including: identifying a first bin, from among a plurality of bins in a first subwindow of the window, the first bin containing n values, n being a positive integer, n being greater than or equal to the number of values in each of the other bins in the first subwindow; calculating a first height-to-area ratio, the first height-to-area ratio being equal to n divided by the number of values in the first subwindow; and comparing the first height-to-area ratio to a first threshold.

In some embodiments, method further includes: illuminating an object with a pulse of light; and measuring a first delay to a detection of a pulse from a photodetector, the photodetector being configured to receive light reflected from the object, wherein a first value of the n values is proportional to the first delay.

In some embodiments, method further includes: determining that the first height-to-area ratio exceeds the first threshold; and estimating a range to the object based on the upper limit of the first bin or on the lower limit of the first bin.

In some embodiments, the estimating of the range to the object includes estimating the range to the object based on the average of the upper limit of the first bin the lower limit of the first bin.

In some embodiments, the first subwindow has a lower limit and an upper limit, and a difference between the upper limit of the first subwindow and the lower limit of the first subwindow is within a second threshold.

In some embodiments, method further includes: identifying a second bin, from among a plurality of bins in a second subwindow of the window, the second bin containing m values, m being a positive integer, m being greater than or equal to the number of values in each of the other bins in the second subwindow; calculating a second height-to-area ratio, the second height-to-area ratio being equal to m divided by the number of values in the second subwindow; and comparing the second height-to-area ratio to the first threshold, wherein the second subwindow overlaps the first subwindow.

In some embodiments, the second subwindow overlaps the first subwindow by an overlap amount.

In some embodiments, the first threshold is within 50% of 0.20.

In some embodiments, method further includes, before the identifying of the first bin: determining that a first received value falls within a second bin; determining that a first bin count register of a plurality of bin count registers is associated with the second bin; and incrementing the first bin count register.

In some embodiments, method further includes, before the identifying of the first bin: determining that a second received value falls within a third bin; determining: that no bin count register of the plurality of bin count registers is associated with the third bin, and that a second bin count register of the plurality of bin count registers is unused; associating the second bin count register with the third bin; and incrementing the second bin count register.

In some embodiments, method further includes, before the identifying of the first bin: determining that a third received value falls within a fourth bin; determining: that no bin count register of the plurality of bin count registers is associated with the fourth bin, and that no bin count register of the plurality of bin count registers is unused; and incrementing a subwindow count register.

According to an embodiment of the present disclosure, there is provided a system, including a processing circuit, the processing circuit being configured to detect a peak bin from among a plurality of bins in a window, each of the bins having a lower limit and an upper limit and containing zero or more values, by: identifying a first bin, from among a plurality of bins in a first subwindow of the window, the first bin containing n values, n being a positive integer, n being greater than or equal to the number of values in each of the other bins in the first subwindow; calculating a first height-to-area ratio, the first height-to-area ratio being equal to n divided by the number of values in the first subwindow; and comparing the first height-to-area ratio to a first threshold.

In some embodiments, system further includes: a laser; and a photodetector, wherein the processing circuit is further configured to: cause the laser to illuminate an object with a pulse of light; and measure a first delay to a detection of a pulse from the photodetector, the photodetector being configured to receive light reflected from the object, wherein a first value of the n values is proportional to the first delay.

In some embodiments, the processing circuit is further configured to: determine that the first height-to-area ratio exceeds the first threshold; and estimate a range to the object based on the upper limit of the first bin or on the lower limit of the first bin.

In some embodiments, the estimating of the range to the object includes estimating the range to the object based on the average of the upper limit of the first bin the lower limit of the first bin.

In some embodiments, the first subwindow has a lower limit and an upper limit, and a difference between the upper limit of the first subwindow and the lower limit of the first subwindow is within a second threshold.

In some embodiments, the processing circuit is further configured to: identifying a second bin, from among a plurality of bins in a second subwindow of the window, the second bin containing m values, m being a positive integer, m being greater than or equal to the number of values in each of the other bins in the second subwindow; calculating a second height-to-area ratio, the second height-to-area ratio being equal to m divided by the number of values in the second subwindow; and comparing the second height-to-area ratio to the first threshold, wherein the second subwindow overlaps the first subwindow.

In some embodiments, the second subwindow overlaps the first subwindow by an overlap amount.

In some embodiments, the first threshold is within 50% of 0.20.

According to an embodiment of the present disclosure, there is provided a system, including: means for processing, the means for processing being configured to detect a peak bin from among a plurality of bins in a window, each of the bins having a lower limit and an upper limit and containing zero or more values, by: identifying a first bin, from among a plurality of bins in a first subwindow of the window, the first bin containing n values, n being a positive integer, n being greater than or equal to the number of values in each of the other bins in the first subwindow; calculating a first height-to-area ratio, the first height-to-area ratio being equal to n divided by the number of values in the first subwindow; and comparing the first height-to-area ratio to a first threshold.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for the detection of reflected light pulses in the presence of ambient light provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
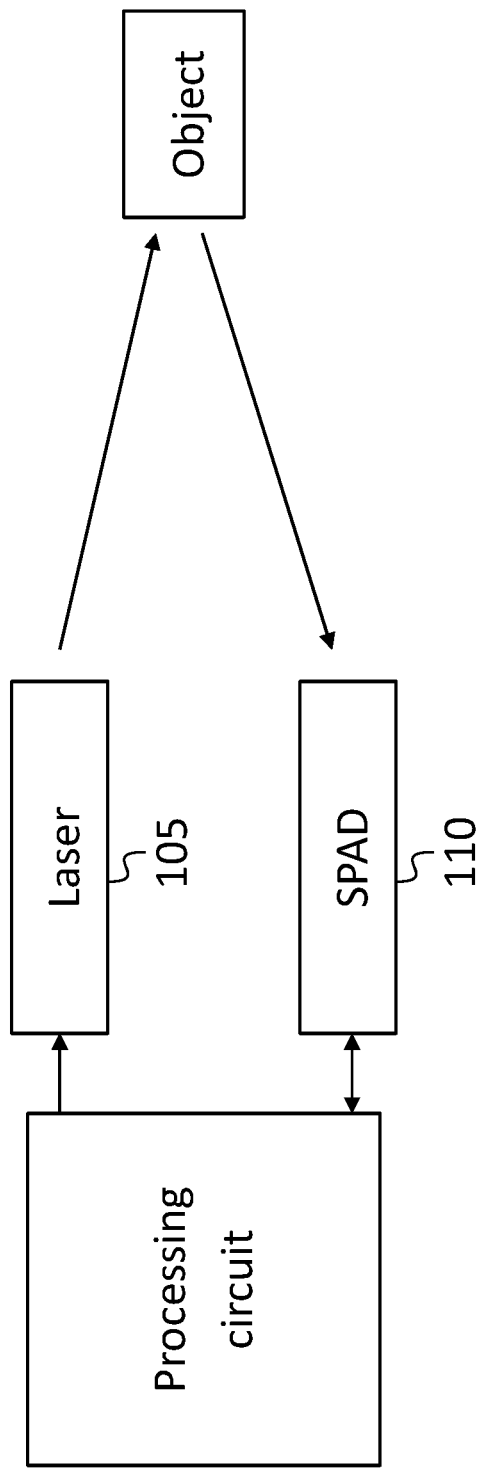
FIG. 1 is a block diagram of a lidar system and a target, according to an embodiment of the present disclosure.

FIG. 1 is a block diagram of a lidar system. In a lidar system, a pulse of light (e.g., a laser pulse from a laser 105) may be used to illuminate an object, and the range of the object may be calculated from the time of receipt of reflected light from the object. A photodetector 110 such as a single photon avalanche diode (SPAD) may be enabled or "armed" some time before the earliest anticipated arrival time of reflected light from the object, and then the time of receipt of any pulse, generated by the photodetector 110 when a photon is detected, may be recorded. This process may be repeated numerous times, especially if the signal due to light reflected from the object is weak, or if the photon flux due to ambient light is high. In some embodiments a plurality of photodetectors 110 is employed (e.g., in an array) to further improve the system's ability to collect light reflected from the object. Each pulse detected by the one or more photodetectors 110 may be recorded as a respective delay (e.g., the delay from the emission of the laser pulse to the generation of the pulse from the photodetector 110, or the delay from the enabling of the one or more photodetectors 110 to the generation of the pulse from the photodetector 110). A processing circuit 115 (discussed in further detail below) may control the laser 105 and the photodetector 110, and may perform some or all of the analysis of measured delays, as described herein.

Each delays may be measured, for example, by starting a counter (configured to count at the frequency of a timing clock) when a start trigger is received (e.g., a start trigger corresponding to the emission of a pulse by the laser or to the arming of the one or more photodetectors 110), and stopping the counter, or transferring its contents to a register, when a stop trigger is received (the stop trigger corresponding to a pulse being generated by a photodetector). As such, each delay may be characterized by a binary delay value, which may be equal to the delay times the timing clock frequency (i.e., the binary delay value may be proportional to the delay). The counter may be part of a timing circuit, which may be connected to or part of the processing circuit 115.

Figure 2A:
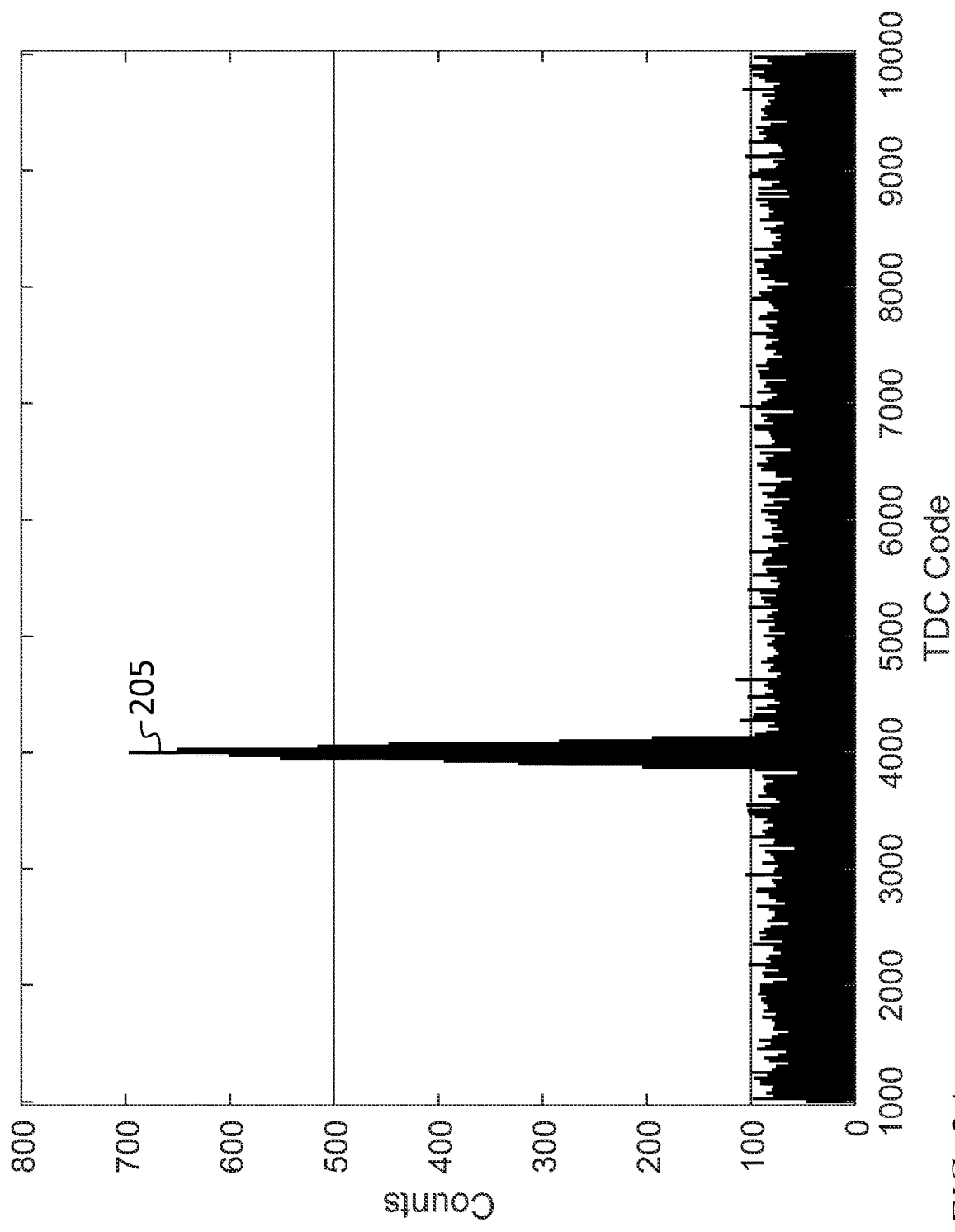
FIG. 2A is a graph of a histogram, according to an embodiment of the present disclosure.

If the delays are collected in a histogram, the histogram may contain a peak (or "signal peak") 205, as shown in FIG. 2, the signal peak 205 being at a delay corresponding to the round-trip light travel time, from the lidar system to the object and back. The histogram of FIG. 2A may be characteristic of data obtained when ambient light is low. The histogram may include (e.g., consist of) a plurality of bins, each bin being defined by an upper limit and a lower limit, and any delay that falls between the lower limit and the upper limit may be considered to be "in" or "within" the bin. Once a signal peak has been identified, the range of the target may be calculated by multiplying one half of an estimated round-trip light travel time (corresponding to the signal peak) by the speed of light. The estimated round-trip light travel time may be based on the lower limit of the bin or on the upper limit of the bin, e.g., it may be the lower limit of the bin or the upper limit of the bin or the average of the lower limit and the upper limit.

Figure 2B:
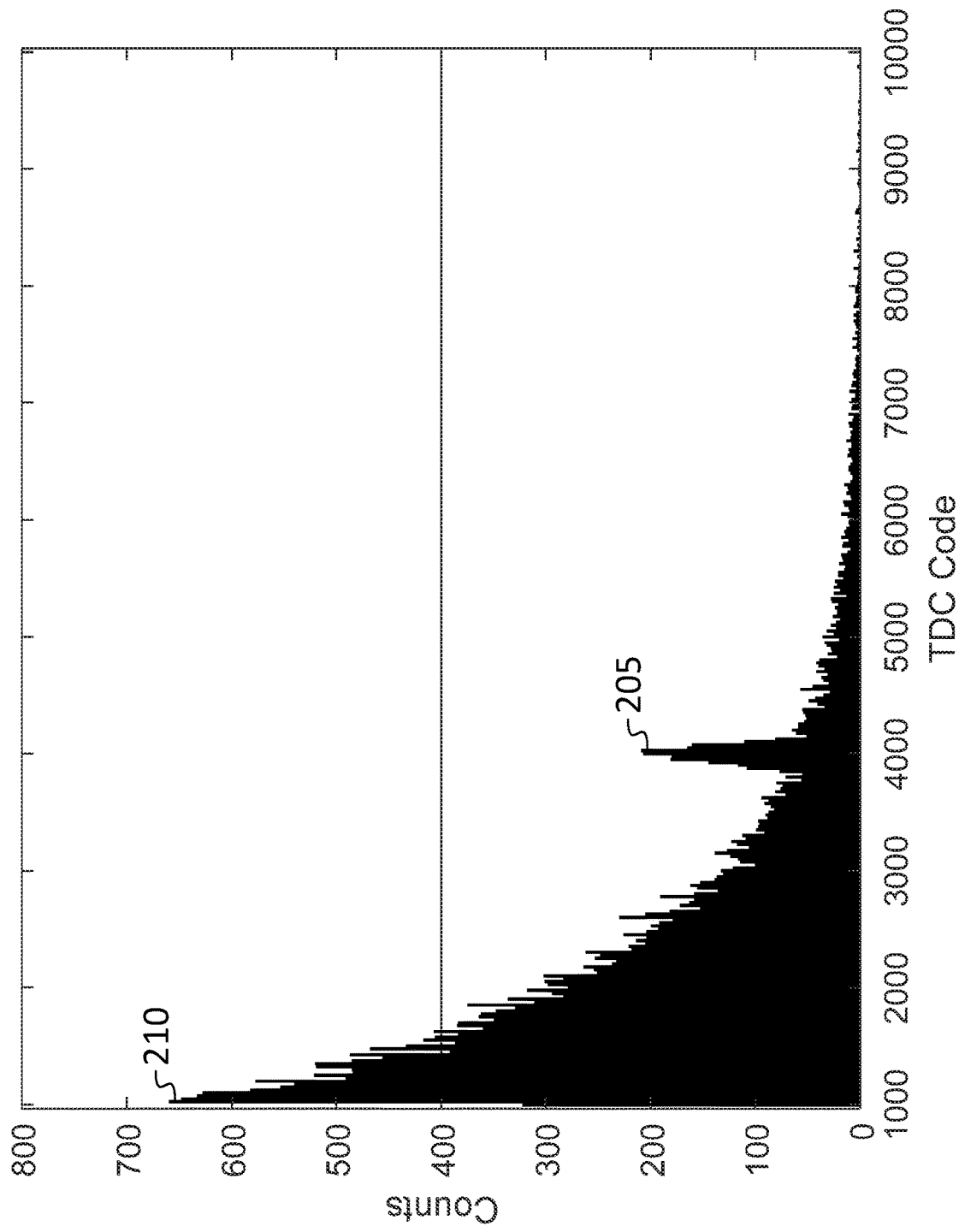
FIG. 2B is a graph of a histogram, according to an embodiment of the present disclosure.

If the one or more photodetectors 110 receive a significant amount of ambient light, then there may be a high likelihood of any photodetector 110 being triggered by an ambient light photon before it receives a photon reflected from the object. This may result in a low-delay peak that may be referred to as "pile-up" or as an "ambient peak" 210, as shown in FIG. 2B. Some algorithms for finding the peak in the histogram (e.g., finding the bin containing the largest number of values, in the histogram), which may be acceptable in low ambient light conditions (e.g., conditions leading to the histogram of FIG. 2A) may fail to find the signal peak in the presence of a large ambient peak 210, by detecting the ambient peak instead of the signal peak.

Figure 3A:
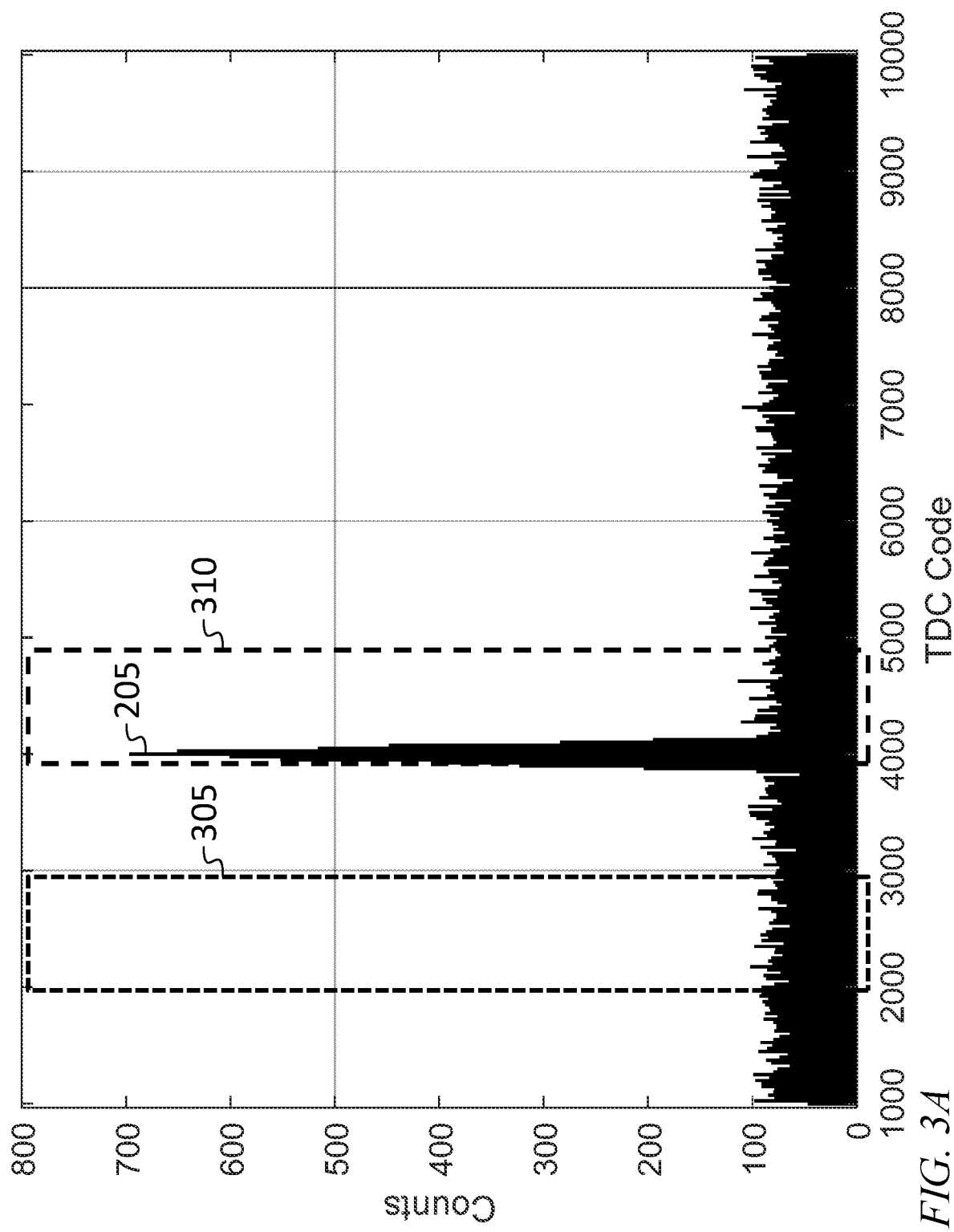
FIG. 3A is a graph of a histogram, according to an embodiment of the present disclosure.

In some embodiments, an algorithm for finding a signal peak 205 may reduce the risk of incorrectly identifying the ambient peak as the signal peak. Referring to FIG. 3A, a plurality of subwindows may be defined within the window of the histogram (the window being the entire time extent of the histogram), and within each subwindow a test may be performed to assess whether the largest value in the subwindow is the signal peak 205. This test may involve (a) calculating a "height-to-area ratio" (or "frequency"), the height-to-area ratio being equal to (i) the number of values in the bin containing the largest number of values (i.e., the bin corresponding to the tallest bar in the histogram) divided by (ii) the total number of values in the subwindow (i.e., the sum of the heights of all of the histogram bars within the subwindow), and (b) comparing the ratio to a threshold, e.g., to 10% or to 20%. In some embodiments, the threshold is between 0.1% and 70.0%.

Each of the ranges of the histogram (e.g., the window, each subwindow, and each bin) may have an upper limit and a lower limit, and any delay value that falls between the lower limit and the upper limit may be considered to be "in" or "within" the corresponding range. Each bin may have a range including only one delay value (at the precision (e.g., the clock period) at which the delays are measured), or it may include a plurality of consecutive delay values. The width of any subwindow may be selected based on various factors, including the duration of the laser pulse, the ambient level, and system memory. In some embodiments the subwindow width is chosen to be at least as great as the duration of the laser pulse. The subwindows may be chosen to overlap (e.g., the upper limit of a first subwindow may be greater than the lower limit of a second subwindow and less than the upper limit of the second subwindow) by an overlap amount δ (e.g., in one embodiment, δ=50% of a duration of the laser pulse; in one embodiment δ=0, meaning no overlapping).

If the height-to-area ratio exceeds the first threshold, the algorithm may conclude that the bin having the largest number of values is the signal peak 205; otherwise the algorithm may conclude that it is not. The algorithm may be expressed in pseudo-code as follows:

In the pseudo-code listing above, M is the number of subwindows defined, $t_i$ and $t_i+e$ are the lower limit and upper limit of the $i^{th}$ subwindow and e>δ, τ is the first threshold, each "event" is the generating of a pulse by a photodetector 110, and t is the corresponding time interval.

Figure 3B:
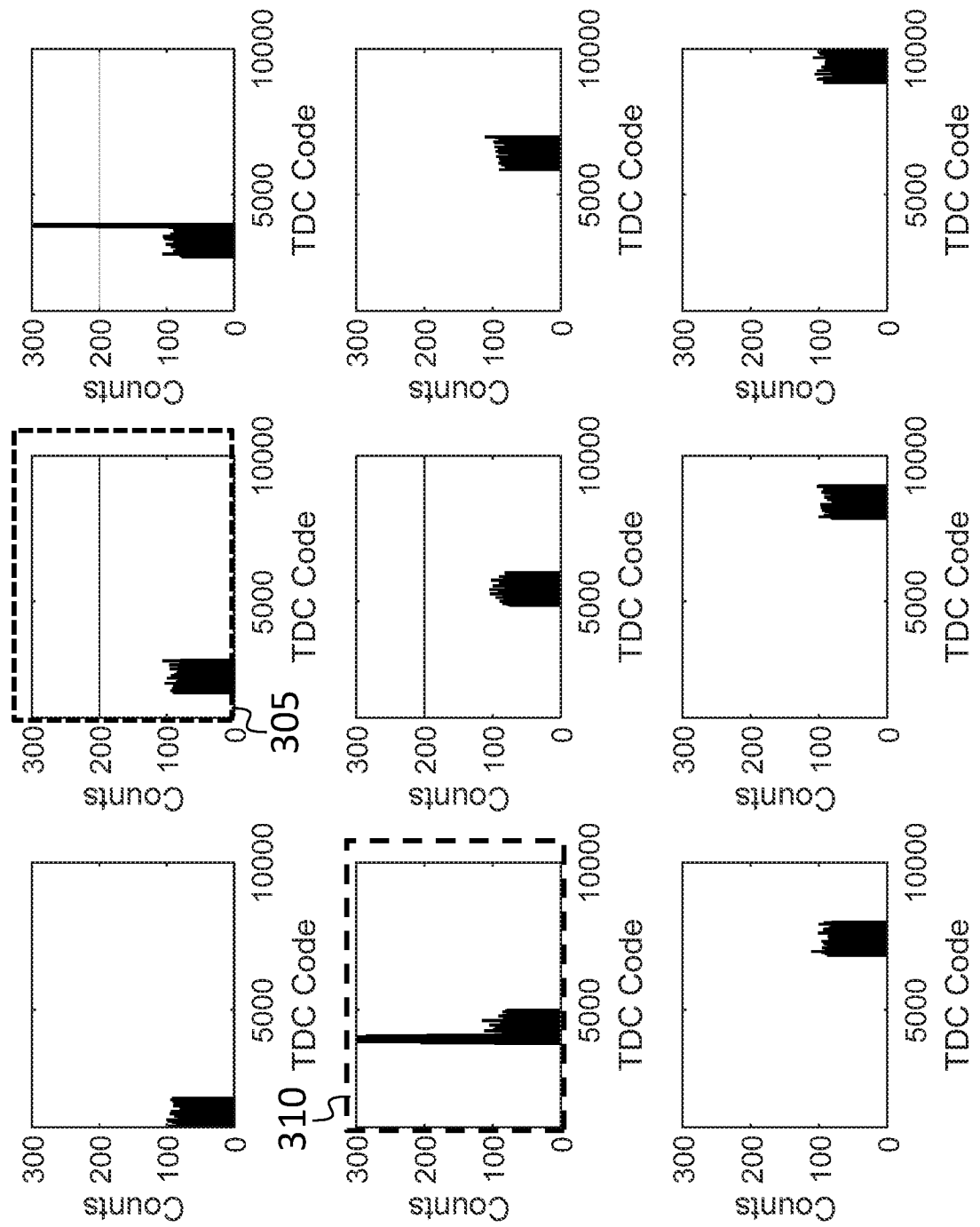
FIG. 3B is an illustration of a plurality of subwindows of a histogram, according to an embodiment of the present disclosure.

FIG. 3A shows the histogram of FIG. 1A, with a first subwindow 305 (an example of a subwindow not containing the signal peak 205) and a second subwindow 310 that contains the signal peak 205. FIG. 3B shows the bins in each of nine subwindows (including the first subwindow 305 and the second subwindow 310) that may be formed within the window of FIG. 3A, in some embodiments. It may be seen that in the second subwindow 310, the ratio of the tallest bar of the histogram to the total area of the bars in the histogram is relatively high, and considerably greater than the corresponding ratio for the first subwindow 305 (which does not contain the signal peak 205). For the simulation that generated the data of FIGS. 3A and 3B, the height-to-area ratio calculated for highest peak in the second subwindow 310 is greater than 10%, i.e., if the first threshold is 10%, the algorithm will correctly identify the highest peak in the second subwindow 310 as the signal peak.

Figure 4A:
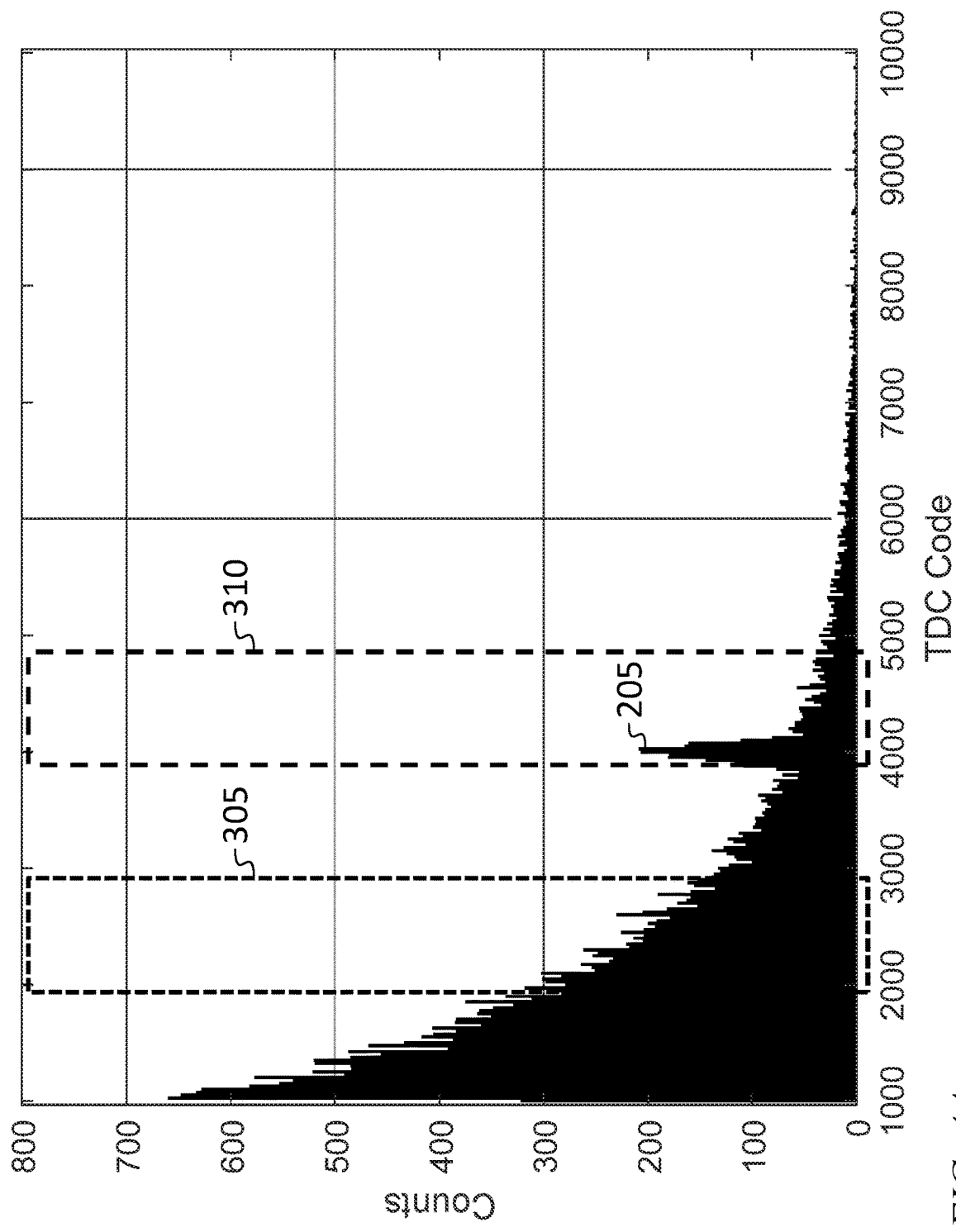
FIG. 4A is a graph of a histogram, according to an embodiment of the present disclosure.
Figure 4B:
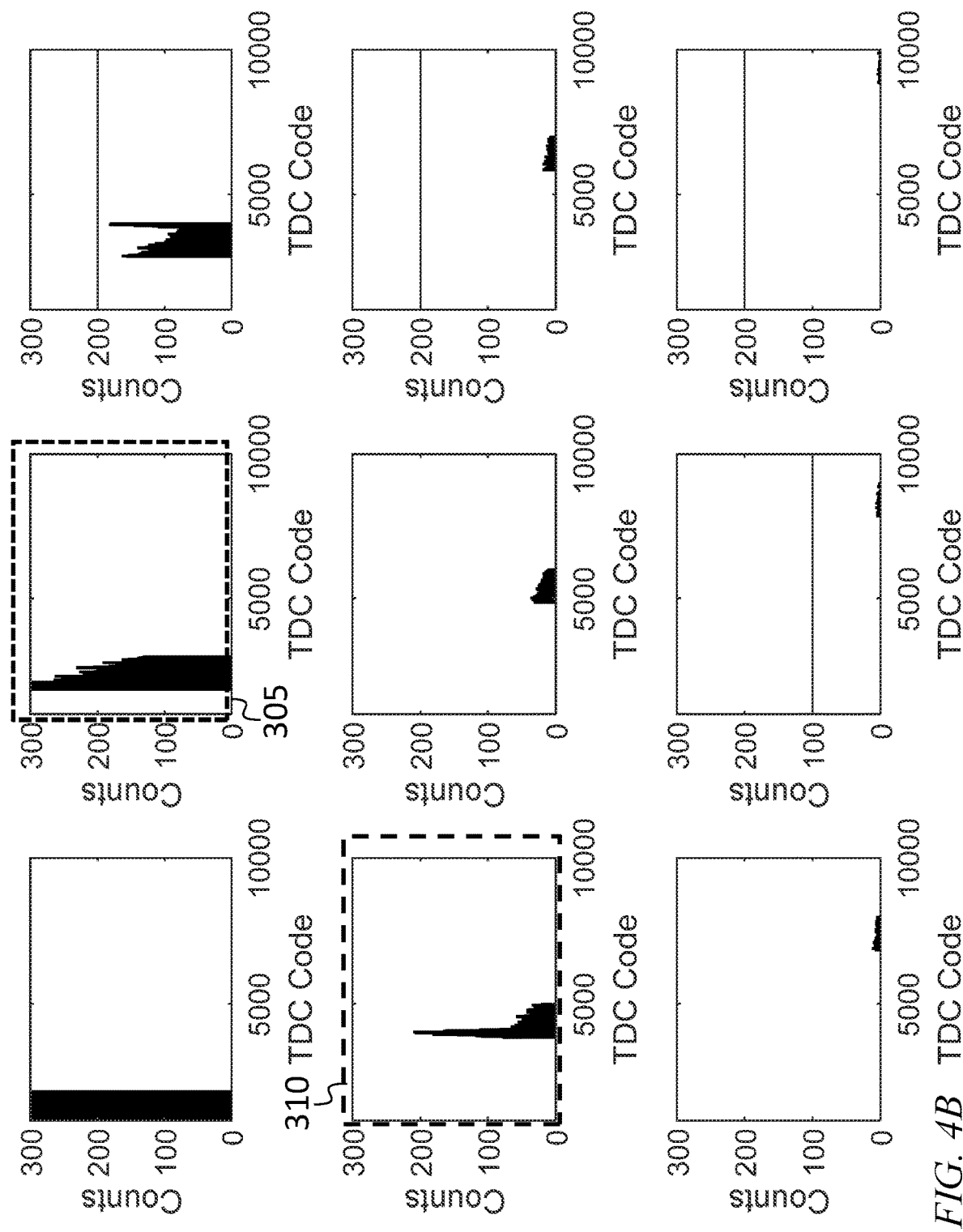
FIG. 4B is an illustration of a plurality of subwindows of a histogram, according to an embodiment of the present disclosure.

FIG. 4A shows the histogram of FIG. 1B, with a first subwindow 305 (an example of a subwindow not containing the signal peak 205) and a second subwindow 310 that contains the signal peak 205. FIG. 4B shows the bins in each of nine subwindows (including the first subwindow 305 and the second subwindow 310) that may be formed within the window of FIG. 4A, in some embodiments. It may be seen that, as in the case of FIGS. 3A and 3B, in the second subwindow 310, the ratio of the tallest bar of the histogram to the total area of the bars in the histogram is relatively high, and considerably greater than the corresponding ratio for the first subwindow 305 (which does not contain the signal peak 205). For the simulation that generated the data of FIGS. 4A and 4B, the height-to-area ratio calculated for highest peak in the second subwindow 310 is greater than 10%, i.e., if the first threshold is 10%, the algorithm will correctly identify the highest peak in the second subwindow 310 as the signal peak. Although the difference between the bin having the largest number of values and the bin having the smallest number of values in the subwindows that are affected by ambient photons is significant, the height-to-area ratio does not exceed 10% for these subwindows.

Figure 5:
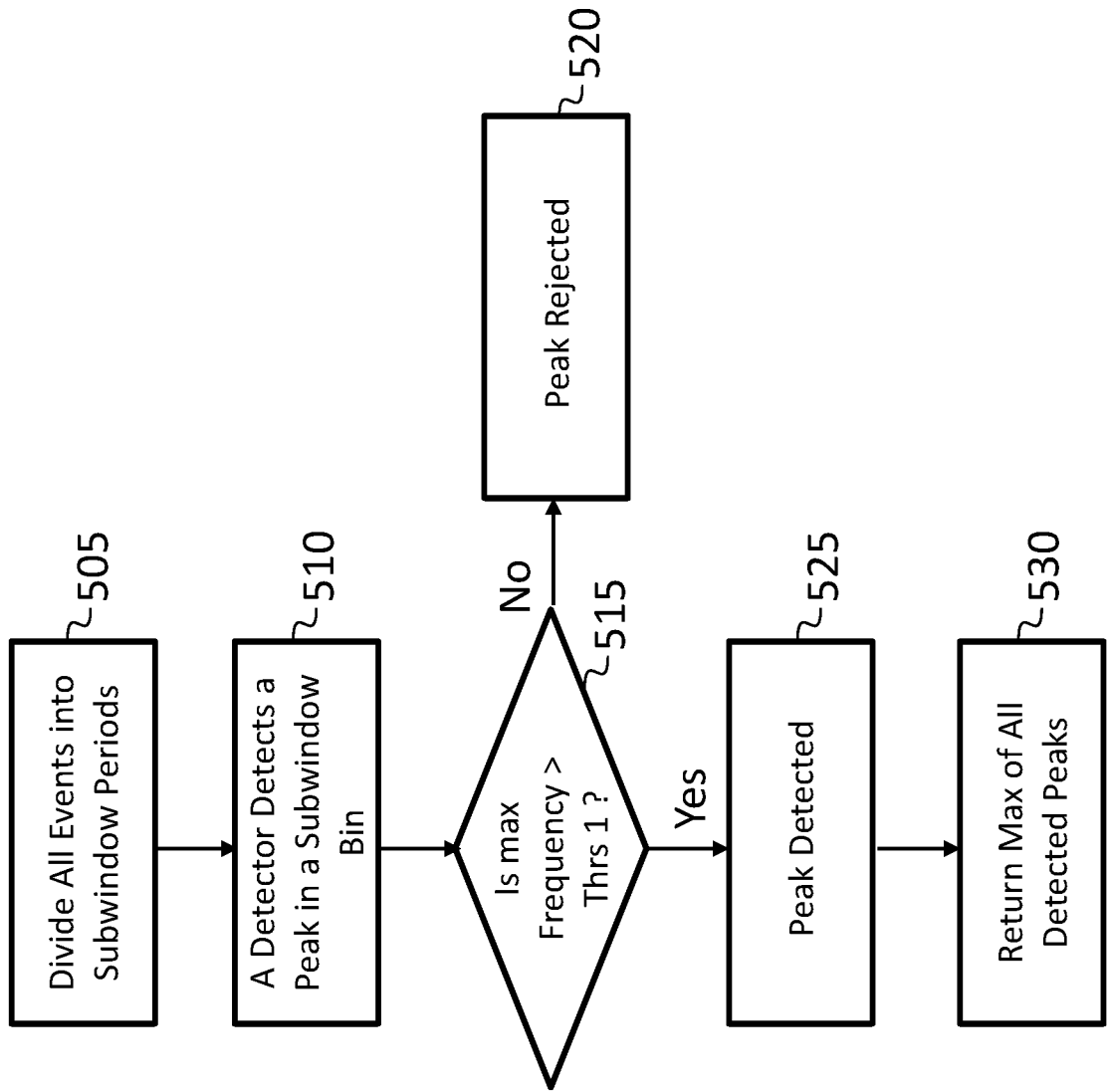
FIG. 5 is a flowchart of a method for the detection of reflected light pulse, according to an embodiment of the present disclosure.

FIG. 5 is a flowchart of a method for finding a peak, in some embodiments. At 505, a plurality of subwindows is formed, and at 510, a peak detector circuit detects a peak in a subwindow of the plurality of subwindows. At 515, the height-to-area ratio (or "frequency") for the peak (i.e., for the bin within the subwindow that contains the largest number of values) (the height-to-area ratio for this bin being the max frequency) is compared to the first threshold (e.g., 10%); if the height-to-area ratio is not greater than the first threshold, the bin is rejected, at 520, as a signal peak

```
1.   Divide total timeline to t_0,... ,t_M
2.   Prepare M peak detectors {D_i}, each responsible for timestamp within [t_i, t_i+e)
3.   FOR each event t
4.       IF t ∈ [t_i, t_i+e), THEN update D_i with t, ENDIF
5.   END FOR
6.   FOR each detector D_i
7.       IF peak is detected in D_i AND occurrence frequency > τ
8.           THEN p ← detect_peak(D_i)
9.       ENDIF
10.  END FOR
11.  RETURN max of {p}
``` candidate. If the height-to-area ratio is greater than the first threshold, the peak is accepted, at 525, as a signal peak candidate; if more than one peak (in a plurality of respective subwindows) is accepted as a signal peak candidate, then the one corresponding to the bin having the largest number of values is selected as the signal peak 205.

In some embodiments, a circuit (e.g., a processing circuit, discussed in further detail below) for detecting a signal peak includes a register for each of the bins in the window. As the delay of each pulse is received by the circuit, the register for the bin within which the delay falls is incremented. When a sufficient number of pulse delay values has been collected, the circuit calculates, within each subwindow, the height-to-area ratio, and compares it to the first threshold.

Figure 6:
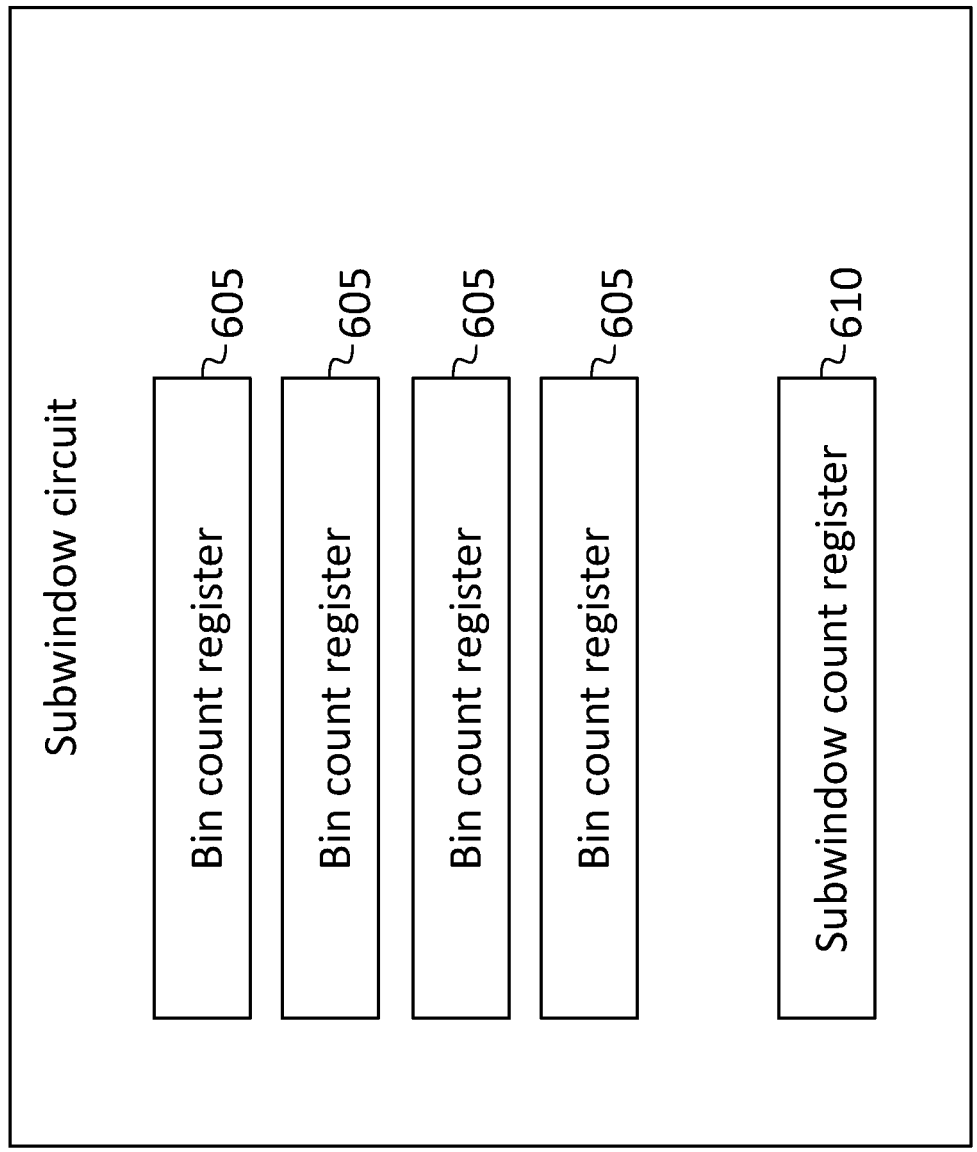
FIG. 6 is a block diagram of a portion of a processing circuit, according to an embodiment of the present disclosure.

In some embodiments, the peak detection is performed in a "streaming" fashion which may require significantly fewer registers. Referring to FIG. 6, in such an embodiment, a subwindow circuit corresponding to one of the subwindows may include a number of bin count registers 605 and a subwindow count register 610. The number of bin count registers 605 may be significantly smaller (e.g., by a factor of 10) than the number of bins in the subwindow. In operation, each bin has a bin count register 605 assigned to it as needed to count delay values falling within the bin, until all of the bin count registers 605 have been assigned. After all of the bin count registers 605 have been assigned, any delay that falls into a bin to which no bin count register 605 is assigned causes the subwindow count register 610 to be incremented. Once a sufficient number of delay values has been received, the subwindow circuit (or another part of the processing circuit containing the subwindow circuit) calculates the height-to-area ratio as (i) the count in the bin count register 605 containing the largest count divided by (ii) the sum of all of the registers (the bin count registers 605 and the subwindow count register 610).

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

As used herein, "a portion of" something means "at least some of" the thing, and as such may mean less than all of, or all of, the thing. As such, "a portion of" a thing includes the entire thing as a special case, i.e., the entire thing is an example of a portion of the thing.

As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for the detection of reflected light pulses in the presence of ambient light have been specifically described and illustrated herein, many modifications and variations will be apparent to those skilled in the art. Accordingly, it is to be understood that a system and method for the detection of reflected light pulses in the presence of ambient light constructed according to principles of this disclosure may be embodied other than as specifically described herein. The invention is also defined in the following claims, and equivalents thereof.

What is claimed is:

1. A method for detecting a peak bin from among a plurality of bins in a window corresponding to a time interval, each of the bins having a lower limit and an upper limit and containing zero or more values, the method comprising:
   illuminating an object with a pulse of light;
   identifying n values based on the illuminating of the object, n being a positive integer;
   identifying a first bin of a histogram, from among a plurality of bins in a first subwindow of the window, the first bin containing then values, n being greater than or equal to a first number of values in each of other ones of the plurality of bins in the first subwindow;
   calculating a first height-to-area ratio, the first height-to-area ratio being equal to n divided by a sum of the n values and p values in the first subwindow, p being a positive integer, the p values corresponding a second bin of the plurality of bins; and
   comparing the first height-to-area ratio to a first threshold for estimating a range to the object.

2. The method of claim 1, further comprising:
   measuring a first delay to a detection of a pulse from a photodetector, the photodetector being configured to receive light reflected from the object,
   wherein a first value of the n values is proportional to the first delay.

3. The method of claim 2, further comprising:
   determining that the first height-to-area ratio exceeds the first threshold, wherein the estimating of the range to the object is based on the upper limit of the first bin or on the lower limit of the first bin.

4. The method of claim 3, wherein the estimating of the range to the object comprises estimating the range to the object based on an average of the upper limit of the first bin and the lower limit of the first bin.

5. The method of claim 2, wherein the first subwindow has a lower limit and an upper limit, and a difference between the upper limit of the first subwindow and the lower limit of the first subwindow is within a second threshold.

6. The method of claim 2, further comprising:
   identifying a second bin, from among a plurality of bins in a second subwindow of the window, the second bin containing m values, m being a positive integer, m being greater than or equal to a second number of values in each of other ones of the plurality of bins in the second subwindow;
   calculating a second height-to-area ratio, the second height-to-area ratio being equal to m divided by the number of values in the second subwindow; and
   comparing the second height-to-area ratio to the first threshold,
   wherein the second subwindow overlaps the first subwindow.

7. The method of claim 6, wherein the second subwindow overlaps the first subwindow by an overlap amount.

8. The method of claim 1, wherein the first threshold is within 50% of 0.20.

9. The method of claim 1, further comprising, before the identifying of the first bin:
   determining that a first received value falls within a second bin;
   determining that a first bin count register of a plurality of bin count registers is associated with the second bin; and
   incrementing the first bin count register.

10. The method of claim 9, further comprising, before the identifying of the first bin:
    determining that a second received value falls within a third bin;
    identifying an available second bin count register of the plurality of bin count registers;
    associating the second bin count register with the third bin; and
    incrementing the second bin count register.

11. The method of claim 10, further comprising, before the identifying of the first bin:
    determining that a third received value falls within a fourth bin;
    determining unavailability of the plurality of bin count registers for being assigned to the fourth bin; and
    incrementing a subwindow count register in response to the third received value and the determining of the unavailability of the plurality of bin count registers.

12. A system, comprising:
    a laser for illuminating an object with a pulse of light; and
    a processing circuit,
    the processing circuit being configured to identify n values based on the illuminating of the object, n being a positive integer, the processing circuit being further configured to detect a peak bin of a histogram from among a plurality of bins in a window corresponding to a time interval, each of the bins having a lower limit and an upper limit and containing zero or more values, by:
    identifying a first bin, from among a plurality of bins in a first subwindow of the window, the first bin containing the n values, n being greater than or equal to a first number of values in each of other ones of the plurality of bins in the first subwindow;
    calculating a first height-to-area ratio, the first height-to-area ratio being equal to n divided by a sum of the n values and p values in the first subwindow, p being a positive integer, the p values corresponding a second bin of the plurality of bins; and
    comparing the first height-to-area ratio to a first threshold for estimating a range to the object.

13. The system of claim 12, further comprising:
    a photodetector,
    wherein the processing circuit is further configured to:
    measure a first delay to a detection of a pulse from the photodetector, the photodetector being configured to receive light reflected from the object,
    wherein a first value of the n values is proportional to the first delay.

14. The system of claim 13, wherein the processing circuit is further configured to:
    determine that the first height-to-area ratio exceeds the first threshold wherein the processing circuit if further configured to estimate the range to the object based on the upper limit of the first bin or on the lower limit of the first bin.

15. The system of claim 14, wherein the estimating of the range to the object comprises estimating the range to the object based on an average of the upper limit of the first bin and the lower limit of the first bin.

16. The system of claim 13, wherein the first subwindow has a lower limit and an upper limit, and a difference between the upper limit of the first subwindow and the lower limit of the first subwindow is within a second threshold.

17. The system of claim 13, wherein the processing circuit is further configured to:
identifying a second bin, from among a plurality of bins in a second subwindow of the window, the second bin containing m values, m being a positive integer, m being greater than or equal to a second number of values in each of other ones of the plurality of bins in the second subwindow;
calculating a second height-to-area ratio, the second height-to-area ratio being equal to m divided by the number of values in the second subwindow; and
comparing the second height-to-area ratio to the first threshold,
wherein the second subwindow overlaps the first subwindow.

18. The system of claim 17, wherein the second subwindow overlaps the first subwindow by an overlap amount.

19. The system of claim 12, wherein the first threshold is within 50% of 0.20.

20. A system, comprising:
means for illuminating an object with a pulse of light; and
means for processing,
the means for processing being configured to identify n values based on the illuminating of the object, n being a positive integer, the means for processing further being configured to detect a peak bin of a histogram from among a plurality of bins in a window corresponding to a time interval, each of the bins having a lower limit and an upper limit and containing zero or more values, by:
identifying a first bin, from among a plurality of bins in a first subwindow of the window, the first bin containing then values, n being greater than or equal to a first number of values in each of other ones of the plurality of bins in the first subwindow;
calculating a first height-to-area ratio, the first height-to-area ratio being equal to n divided by a sum of the n values and p values in the first subwindow, p being a positive integer, the p values corresponding a second bin of the plurality of bins; and
comparing the first height-to-area ratio to a first threshold for estimating a range to the object.

* * * * *